(12) United States Patent
Fullbright et al.

(10) Patent No.: US 9,383,924 B1
(45) Date of Patent: Jul. 5, 2016

(54) STORAGE SPACE RECLAMATION ON VOLUMES WITH THIN PROVISIONING CAPABILITY

(71) Applicant: NetApp, Inc., Sunnyvale, CA (US)

(72) Inventors: John Keith Fullbright, Evans, GA (US); Clinton Douglas Knight, Apex, NC (US)

(73) Assignee: NETAPP, INC., Sunnyvale, CA (US)

( * ) Notice: Subject to any disclaimer, the term of this patent is extended or adjusted under 35 U.S.C. 154(b) by 289 days.

(21) Appl. No.: 13/779,630

(22) Filed: Feb. 27, 2013

(51) Int. Cl.
*G06F 12/02* (2006.01)
*G06F 3/06* (2006.01)

(52) U.S. Cl.
CPC .............. *G06F 3/0608* (2013.01); *G06F 3/067* (2013.01); *G06F 3/0652* (2013.01); *G06F 12/023* (2013.01)

(58) Field of Classification Search
CPC ............ G06F 11/1451; G06F 11/2064; G06F 11/2082; G06F 12/00; G06F 12/12; G06F 12/08; G06F 12/122; G06F 12/02; G06F 12/10; G06F 12/0238; G06F 17/30215; G06F 17/30578; G06F 2201/84
See application file for complete search history.

(56) References Cited

U.S. PATENT DOCUMENTS

| | | | | |
|---|---|---|---|---|
| 7,293,090 B1 * | 11/2007 | Saleh et al. | .................... | 709/226 |
| 7,801,993 B2 * | 9/2010 | Shitomi | ......................... | 709/226 |
| 8,078,816 B1 * | 12/2011 | Thoppai et al. | ................ | 711/162 |
| 8,117,464 B1 * | 2/2012 | Kogelnik | ........................ | 713/193 |
| 8,473,463 B1 * | 6/2013 | Wilk | ..................... | G06F 11/1453 707/647 |
| 8,484,430 B2 * | 7/2013 | Ito | ........................ | G06F 12/0246 711/170 |
| 8,521,987 B2 * | 8/2013 | Iwamitsu et al. | .............. | 711/173 |
| 8,713,278 B2 * | 4/2014 | Palaniappan et al. | .......... | 711/170 |
| 8,880,843 B2 * | 11/2014 | Thomas | ......................... | 711/202 |
| 2004/0107318 A1 * | 6/2004 | Bono et al. | ..................... | 711/118 |

(Continued)

*Primary Examiner* — Jared Rutz
*Assistant Examiner* — Jean Edouard
(74) *Attorney, Agent, or Firm* — Gilliam IP PLLC

(57) ABSTRACT

Techniques for reclaiming storage space are disclosed herein. According to one embodiment, a storage space reclamation method includes a storage host creating at least one temporary logical container of data in a storage volume managed by a file system of a host so that a predetermined portion of storage capacity of the storage volume is occupied. Access to the storage volume is provided by a network storage controller to the storage host. The storage host translates a host address range for the file system of each temporary logical container of data into a storage controller address range for the network storage controller. The storage host requests the network storage controller to deallocate blocks the locations of which are indicated by the storage controller address range, and then deletes the at least one temporary logical container of data.

24 Claims, 6 Drawing Sheets

(56) References Cited

U.S. PATENT DOCUMENTS

| | | | |
|---|---|---|---|
| 2007/0028073 A1* | 2/2007 | Takayama | G06F 3/061 711/203 |
| 2007/0033323 A1* | 2/2007 | Gorobets | G06F 3/0607 711/103 |
| 2007/0033325 A1* | 2/2007 | Sinclair | G06F 3/0605 711/103 |
| 2007/0088930 A1* | 4/2007 | Matsuda | G06F 12/0813 711/170 |
| 2007/0220308 A1* | 9/2007 | Yeung et al. | 714/5 |
| 2007/0233931 A1* | 10/2007 | Tanaka | G06F 12/0246 711/5 |
| 2009/0024752 A1* | 1/2009 | Shitomi | G06F 3/0605 709/230 |
| 2009/0193218 A1* | 7/2009 | Tamura | G06F 3/0613 711/170 |
| 2009/0276590 A1* | 11/2009 | Nagaraj | 711/162 |
| 2010/0169558 A1* | 7/2010 | Honda | G06F 9/4403 711/103 |
| 2010/0281081 A1* | 11/2010 | Stager et al. | 707/814 |
| 2012/0167080 A1* | 6/2012 | Vilayannur | G06F 3/0608 718/1 |
| 2012/0198152 A1* | 8/2012 | Terry et al. | 711/114 |
| 2014/0019701 A1* | 1/2014 | Ohira | G06F 3/0613 711/165 |
| 2014/0149472 A1* | 5/2014 | Wang | 707/813 |
| 2014/0173223 A1* | 6/2014 | DeNeui | G06F 3/0604 711/154 |
| 2014/0189211 A1* | 7/2014 | George | G06F 3/0613 711/103 |
| 2014/0223079 A1* | 8/2014 | Zhang | G06F 12/0246 711/103 |
| 2014/0310430 A1* | 10/2014 | Geddes | G06F 13/122 710/4 |

* cited by examiner

STORAGE SPACE RECLAMATION ON VOLUMES WITH THIN PROVISIONING CAPABILITY

FIELD OF THE INVENTION

At least one embodiment of the present invention pertains to data storage volumes with thin provisioning capabilities, and more particularly, to thinly-provisioned volumes with capability of reclaiming storage space.

BACKGROUND

A network storage controller is a processing system that is used to store and retrieve data on behalf of one or more hosts on a network. A storage controller operates on behalf of one or more hosts to store and manage data in a set of mass storage devices, such as magnetic or optical storage-based disks, tapes, flash memory, etc. Some storage controllers are designed to service file-level requests from hosts, as is commonly the case with file servers used in a network attached storage (NAS) environment. Other storage controllers are designed to service block-level requests from hosts, as with storage controllers used in a storage area network (SAN) environment. Still other storage controllers are capable of servicing both file-level requests and block-level requests, as is the case with certain storage controllers made by NetApp, Inc. of Sunnyvale, Calif.

Some network storage controllers can provide so-called "thin provisioning" capabilities to storage volumes of the storage devices of the controllers. Thin provisioning is a type of virtualization technology to give the appearance of a volume (or a LUN unit) having more storage space than the actual available storage space. Thin provisioning is a technique for optimizing utilization of available storage space. It relies on on-demand allocation of blocks of data versus the traditional method of allocating all the blocks in advance in response to an allocation request. This methodology helps avoid poor space utilization rates that commonly occur in other storage allocation method where large pools of storage capacity are allocated to individual hosts but remain unused (i.e. not written to). With thin provisioning, storage capacity utilization efficiency can be automatically driven up towards 100% with little administrative overhead. The storage controller can first allocate relatively little storage capacity for the volume, and then later increase storage capacity in accordance with actual space usage from the hosts.

A thinly-provisioned volume (i.e. a storage volume that is thinly provisioned by a storage controller) is able to grow and also shrink its storage capacity when needed. A volume is a logical data set which is an abstraction of physical storage, combining one or more physical mass storage devices (e.g., disks) or parts thereof into a single logical storage object. A volume can be, for example, a logical unit identified by a logical unit number (LUN) in a SAN environment. Thin provisioning allows storage space to be easily allocated to hosts, on a just-enough and just-in-time basis.

However, when a storage controller assigns a volume to a host, the host can create its own file system on the volume and do its own file system bookkeeping. As a result, the host can have a very different idea of how much space it is currently using within the volume than what the storage controller has. FIG. 1 illustrates an example scenario of inconsistent views of storage space usage from a storage host and a storage controller. A file system of the storage host manages the storage volume, and the storage controller the data access requests for the storage volume. At step 1 of FIG. 1, the host writes two new files to the volume, each consuming 25% of the total storage space of the volume. Both the host and the storage controller show that 50% of the storage space has been used. At step 2, the host writes another new file of the same size. Again the host and the storage controller both show that 75% of the storage space has been used. At step 3, the host deletes the first and second files. For hosts with most file systems (e.g. New Technology File System, also referred to as NTFS), deleting a file causes the host to deallocate the blocks of the deleted files and record the references to these blocks in a free block data structure (e.g. volume free space map). However, in a SAN environment, there is no mechanism for the host to notify the storage controller of the deletion of the file. The data stored inside the volume is opaque to the storage controller. Hence, the views of the host and the storage system diverge at step 3. The host shows that the volume is only 25% full while the storage system shows that 75% of the volume is in use. The host is under no obligation to reuse the blocks it deallocated, so if the host writes another file to the volume, the fourth file may occupy previously unused space, as shown in step 4. Then the storage controller shows that the volume is full, while the host shows just 50% utilization of the volume.

These discrepancies in views between the host and the storage controller do not pose a serious problem in situations of volumes having fixed sizes. But for a thinly-provisioned volume, there is a big potential difference, from the perspective of the storage controller, between a volume that is considered to be 25% full and one that is considered to be 75% full. The host considers the extra 50% to be unallocated, however, the storage controller does not know that. Consequently, the storage controller would not be able to adjust the thinly-provisioned volume and assign the unallocated space for other purposes. Over a period of time, the storage controller tends to allocate more storage space for the host, while more files are deleted by the host without release from the storage controller's view. The benefits of thin provisioning, therefore, tend to disappear over time. Eventually all storage space of the volume is allocated, and the storage controller can no longer provide thin provisioning capability to the volumes of the hosts.

SUMMARY

Techniques introduced here provide an efficient mechanism for reclaiming storage space. According to one embodiment, a storage space reclamation method includes a storage host creating one or more temporary files on a storage volume managed by a file system of a host so that a predetermined portion of storage capacity of the storage volume is occupied. A file system, as the term is used herein, is a structured set of logical containers of data (which may be, but are not necessarily, in the form of files, directories, logical units and/or other types of logical containers) and software for managing the same. Access to the storage volume is provided by a network storage controller. For each temporary file, the storage host converts a host address range for the storage host into a storage controller address range for the network storage controller. The storage host requests the network storage controller to deallocate blocks the locations of which are indicated by the storage controller address ranges, and then deletes the temporary files. "Blocks" are the basic units of storage space used by a file system for storing user data. A block can be, for example, 4 KBytes, although other block sizes are possible. Once the blocks are freed by the storage controller, they are no longer retained and can be used for purposes such as thin provisioning of volumes and snapshot storage.

The space reclamation techniques introduced here help to prevent the benefits of thin provisioning from eroding over time. By running the disclosed space reclamation process, a thinly-provisioned volume may be maintained at high storage efficiency, such that the amount of storage space consumed on a storage controller is no more than what is actually needed by the host volume's file system.

Furthermore, the space reclamation techniques disclosed herein do not require relocating allocated blocks. This is helpful since some types of volumes, such as Cluster Shared Volumes (CSVs), do not have a simple mechanism for relocating the allocated blocks. Further the space reclamation techniques do not force a CSV into a "redirected I/O" mode. When in "redirected I/O" mode, all writes to the CVS are conducted indirectly via a single node that owns the CSV, which poses a large performance penalty for I/O requests from other nodes in the cluster.

The space reclamation techniques introduced here may be particularly useful in any environment that shows a large variance in the amount of data used. For instance, systems used for queuing print jobs, email, or standard file sharing are excellent candidates for space reclamation on a periodic schedule. Any system that has experienced a major content change is also a good candidate for space reclamation.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
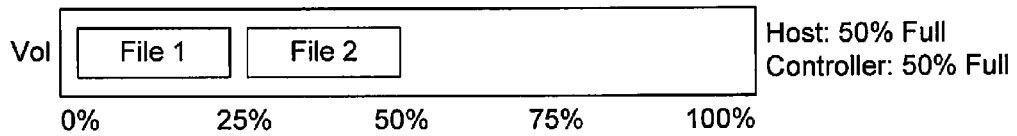
FIG. 1 illustrates an example scenario of out-of-sync views of storage space usage from a storage host and a storage controller.
Figure 1:
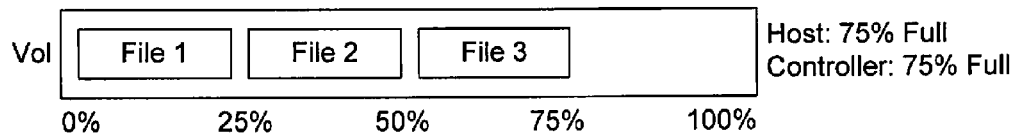
Figure 1:
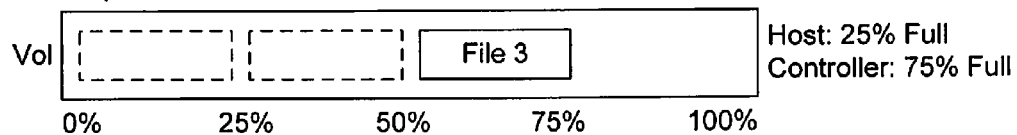
Figure 1:
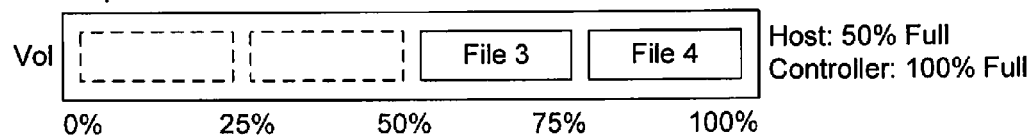
Figure 2:
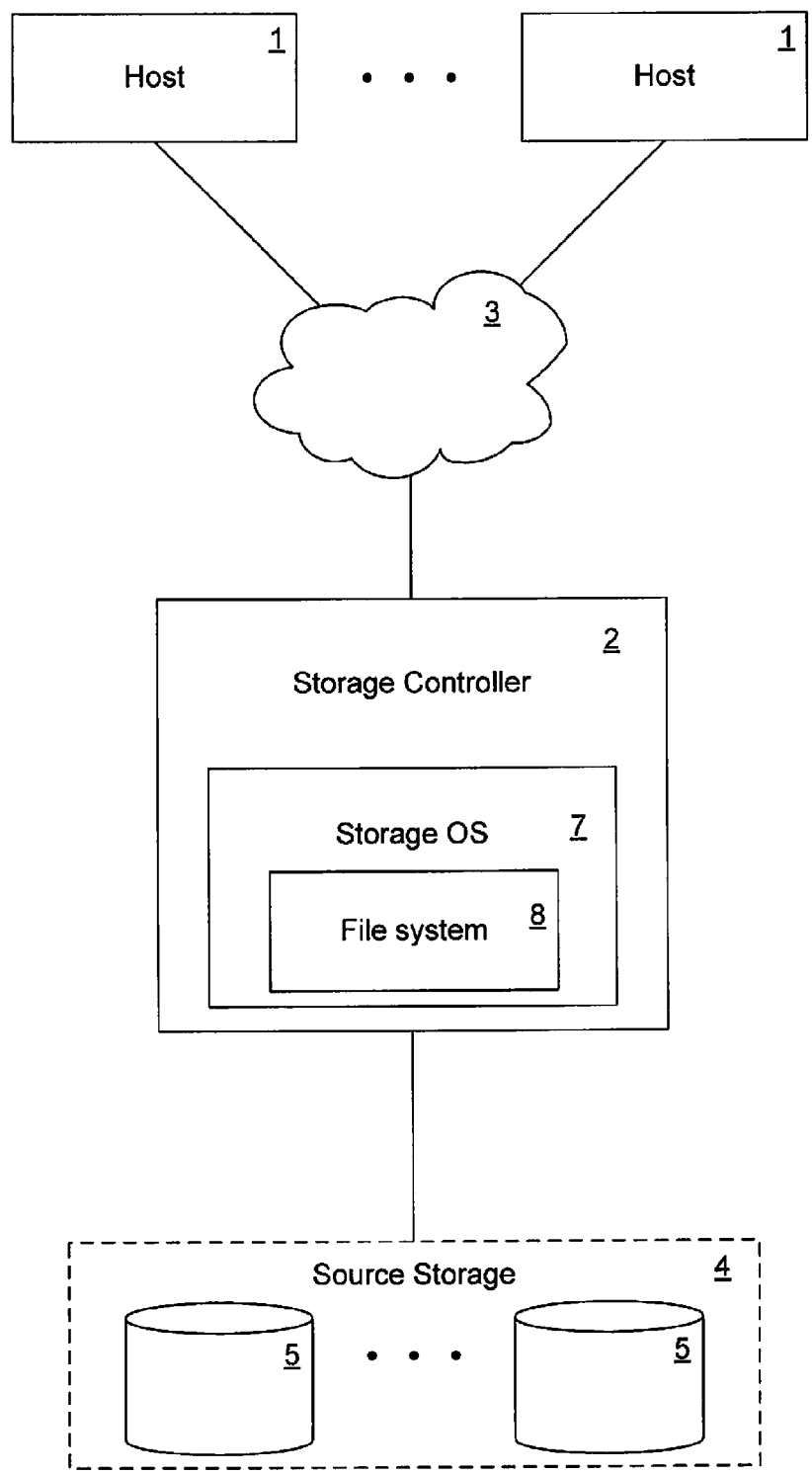
FIG. 2 illustrates an example of a network storage system serving data storage requests from storage hosts.

Refer now to FIG. 2, which shows an example of a network storage system serving data storage requests from storage hosts in which one can implement the technique being introduced here. In FIG. 2, a storage controller 2 is coupled to a set of hosts 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the hosts 1 may be, for example, a conventional personal computer (PC), server-class computer, workstation, handheld computing/communication device, or the like.

Storage of data in the storage subsystem 4 is managed by network storage controller (hereinafter simply "storage controller" or "controller") 2. Storage controller 2 and Storage subsystem 4 are collectively referred to as the storage system. The storage controller 2 receives and responds to various read and write requests from the hosts 1, directed to data stored in or to be stored in storage subsystem 4. Storage subsystem 4 includes a number of nonvolatile mass storage devices 5, which can be, for example, conventional magnetic or optical disks or tape drives; alternatively, they can be non-volatile solid-state memory, such as flash memory, or any combination of such devices. The mass storage devices 5 in storage subsystem 4 can be organized as a Redundant Array of Inexpensive Disks (RAID), in which case the storage controller 2 accesses the storage subsystem 4 using a conventional RAID algorithm for redundancy.

The storage controller 2 includes a storage operating system 7, which is responsible for managing storage of data in the storage subsystem 4, servicing requests from hosts 1, and performing various other types of storage related operations. In one embodiment, the storage operating system 7 can include a file system 8 to manage the storage of data. For instance, the file system can be a Write Anywhere File Layout (WAFL) file system developed by NetApp, Inc.

In certain embodiments, the storage operating system 7 is implemented entirely in the form of software. In other embodiments, however, the storage operating system 7 may be implemented in pure hardware, e.g., specially-designed dedicated circuitry.

Storage controller 2 may be, for example, a storage server which provides file-level data access services to hosts, such as commonly done in a NAS environment, or block-level data access services such as commonly done in a SAN environment, or it may be capable of providing both file-level and block-level data access services to hosts. Further, although the storage controller 2 is illustrated as a single unit in FIG. 2, it can have a distributed architecture. For example, the storage controller 2 can be designed as a physically separate network module (e.g., "N-blade") and disk module (e.g., "D-blade") (not shown), which communicate with each other over a physical interconnect. Such an architecture allows convenient scaling, such as by deploying two or more N-modules and two or more D-modules, all capable of communicating with each other through the interconnect.

Figure 3:
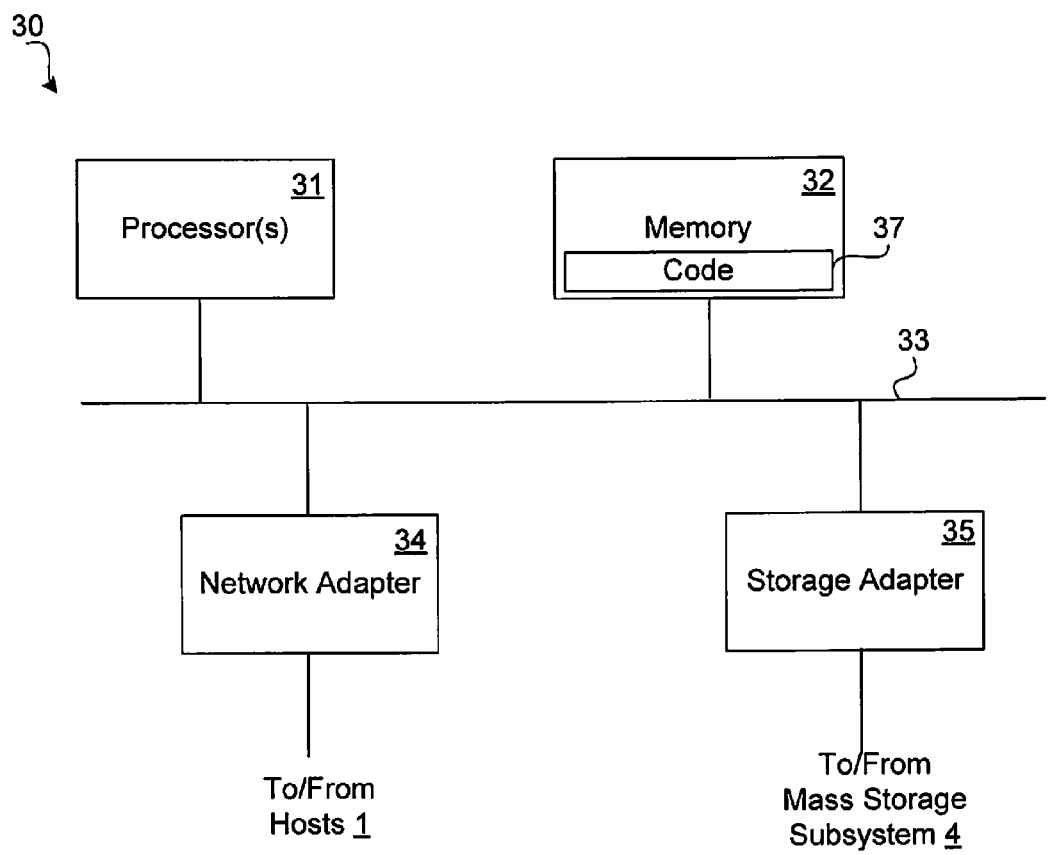
FIG. 3 illustrates an example of a high-level block diagram showing an example of the architecture of a storage host.

Hosts 1 are processing devices (e.g., computers) that send read and write requests to the storage controller 2, directed to data stored in or to be stored in storage subsystem 4. FIG. 3 is a high-level block diagram showing an example of the architecture of a computer node 30. The computer node can be a host or a storage controller. The computer node 30 includes one or more processors 31 and memory 32 coupled to an interconnect 33. The interconnect 33 shown in FIG. 3 is an abstraction that represents any one or more separate physical buses, point to point connections, or both connected by appropriate bridges, adapters, or controllers. The interconnect 33, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 31 is/are the central processing unit (CPU) of the computer node 30 and, thus, control the overall operation of the computer node 30. In certain embodiments, the processor(s) 31 accomplish this by executing software or firmware stored in memory 32. The processor(s) 31 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 32 is or includes the main memory of the computer node 30. The memory 32 represents any form of random access memory (RAM), read-only memory (ROM), flash memory, or the like, or a combination of such devices. In use, the memory 32 may contain, among other things, code 37 embodying at least a portion of an operating system of the computer node 30. For instance, the operating system can be a Windows OS, a Linux OS, a Unix OS, an android or an Apple OS. Code 3 can also include a file system, such as an NTFS file system, FAT file system, EXT file system, or a HFS system.

Also connected to the processor(s) 31 through the interconnect 33 are a network adapter 34 and a storage adapter 35. The network adapter 34 provides the computer node 30 with the ability to communicate with remote devices, such as hosts 1, over the interconnect 3 and may be, for example, an Ethernet adapter or Fibre Channel adapter. The storage adapter 35 allows the computer node 30 to access a storage subsystem, such as storage subsystem 4, and may be, for example, a Fibre Channel adapter or SCSI adapter.

The hosts 1 coupled to the storage system in FIG. 2 can be different types of hosts utilizing different file systems. For instance, a host 1 can be a Cluster Shared Volume (CSV) using an NTFS file system. A CSV is an NTFS volume on a shared disk that is accessible for read and write operations by all nodes within a Windows Server Failover Cluster. CSVs operate by orchestrating metadata I/O operations between the nodes in the cluster via the Server Message Block (SMB) protocol. Read and write operations are passed directly to the serial attached SCSI, iSCSI, Fibre Channel, or Fibre Channel over Ethernet shared storage via block based protocols. CSVs are owned by one node at a time, but multiple nodes may write directly to a CSV. CSV enables a virtual machine (VM) to have complete mobility throughout the cluster since any node can access the Virtual Hard Disk (VHD) files of the virtual machine on the shared CSV volume.

Figure 4:
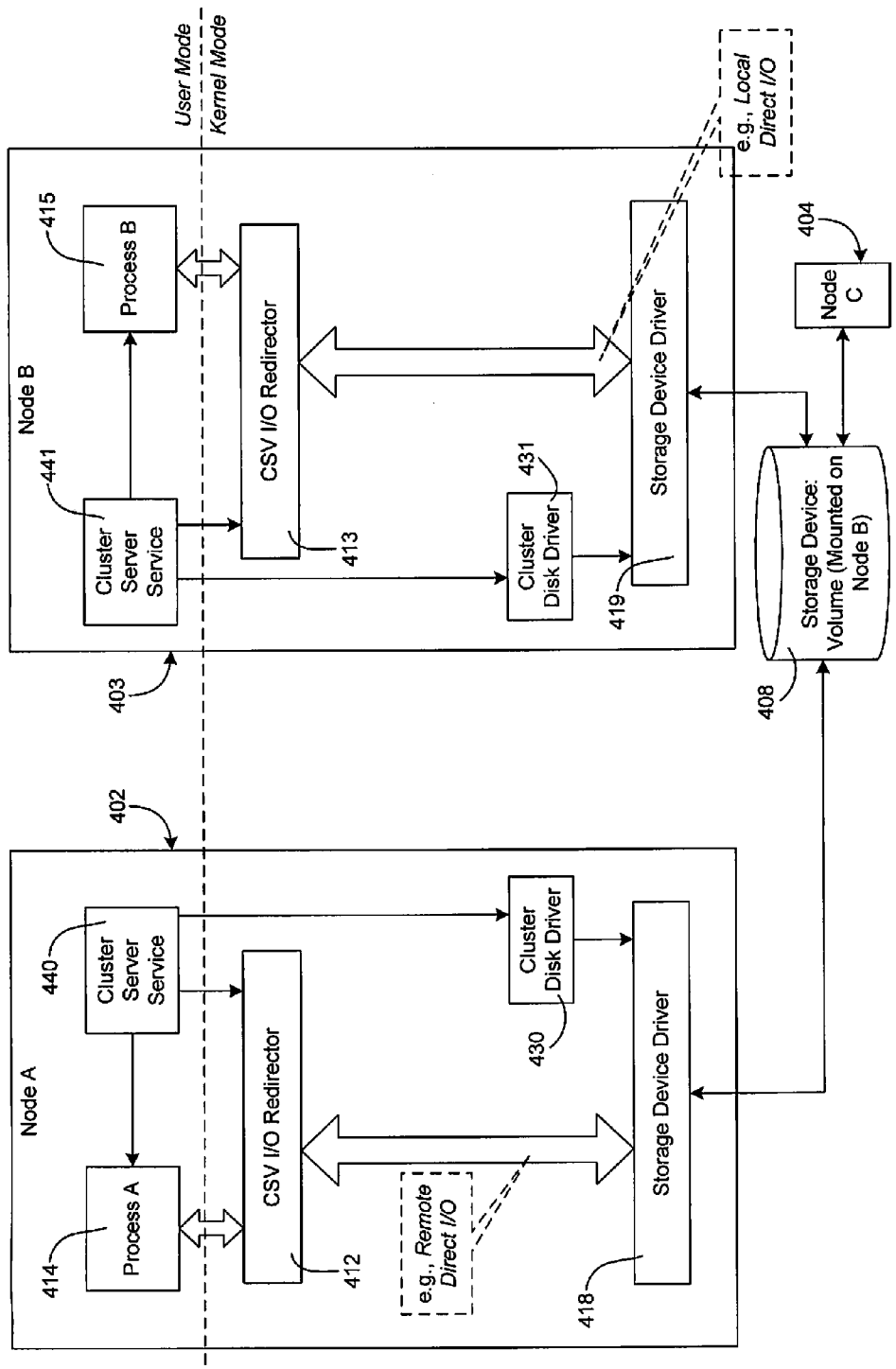
FIG. 4 illustrates a block diagram of an example of a Cluster Shared Volume (CSV) environment that allows access data on the CSV from any node of multiple nodes that form a network storage cluster.

FIG. 4 illustrates a block diagram of a CSV environment that allows clustered applications and services to access their data from any node, of multiple nodes that form a network storage cluster. In general, FIG. 4 shows a three-node network storage cluster, comprising node A 402, node B 403 and node C 404, with one NTFS volume 408 (of a SAN disk) mounted on one of the nodes, namely the node B 403 in this example; (one or more other shared volumes, not shown in FIG. 4, may be mounted on the node B or other nodes). Each node functions as a storage controller. In one embodiment, the volume is assigned and managed by a storage system or storage controller as illustrated in FIG. 2.

Node A 402 includes a CSV redirector 412 to intercept and redirect I/O requests made by the process A 414. Unlike typical network shares, data (read and write) I/O requests may be sent by the CSV redirector 412 directly to the storage device volume 408, which is mounted on Node B 403, through a local storage device driver 418, that is, without involving node B 403 in this example. Note that cluster nodes are typically connected to the cluster's physical storage devices via SCSI, Fibre Channel, Internet Small Computer System Interface (iSCSI) or other high-speed communication links. Similar to Node A 402, Node C 404 can also directly access storage device volume 408 without involving node B 403. Node B 403 can access the storage device volume 408 via node B's redirector 413 and a local storage device driver 419.

As shown in FIG. 4, a CSV allows concurrent access to the volume from multiple cluster nodes. Each node includes a storage device driver for accessing local storage device volumes and remote storage device volumes mounted on other nodes. A storage device driver (e.g., 418) of a remote node with respect to the storage device volume 408 can access the device volume 408 without involving node B 403, while the owning node's storage device driver 419 maintains and protects volume ownership.

Thin provisioning can be applied to different types of volumes (including CSVs) of the storage hosts, and can cause unused allocated storage space as described above. Techniques introduced here, however, provide a highly efficient mechanism for reclaiming the unused allocated storage space. A host determines which blocks on a volume are not in use based on a volume free space map of the volume that the storage host maintains in its memory or storage, and creates temporary files and retrieves block addresses of the temporary files. The host then translates the addresses into address information for the storage controller and communicates the translated address information to the storage controller. In response, the storage controller marks the blocks as free (i.e. deallocated). Once the blocks are marked as free by the storage controller, they can be used for other purposes such as thin provisioning and snapshot storage.

Figure 5:
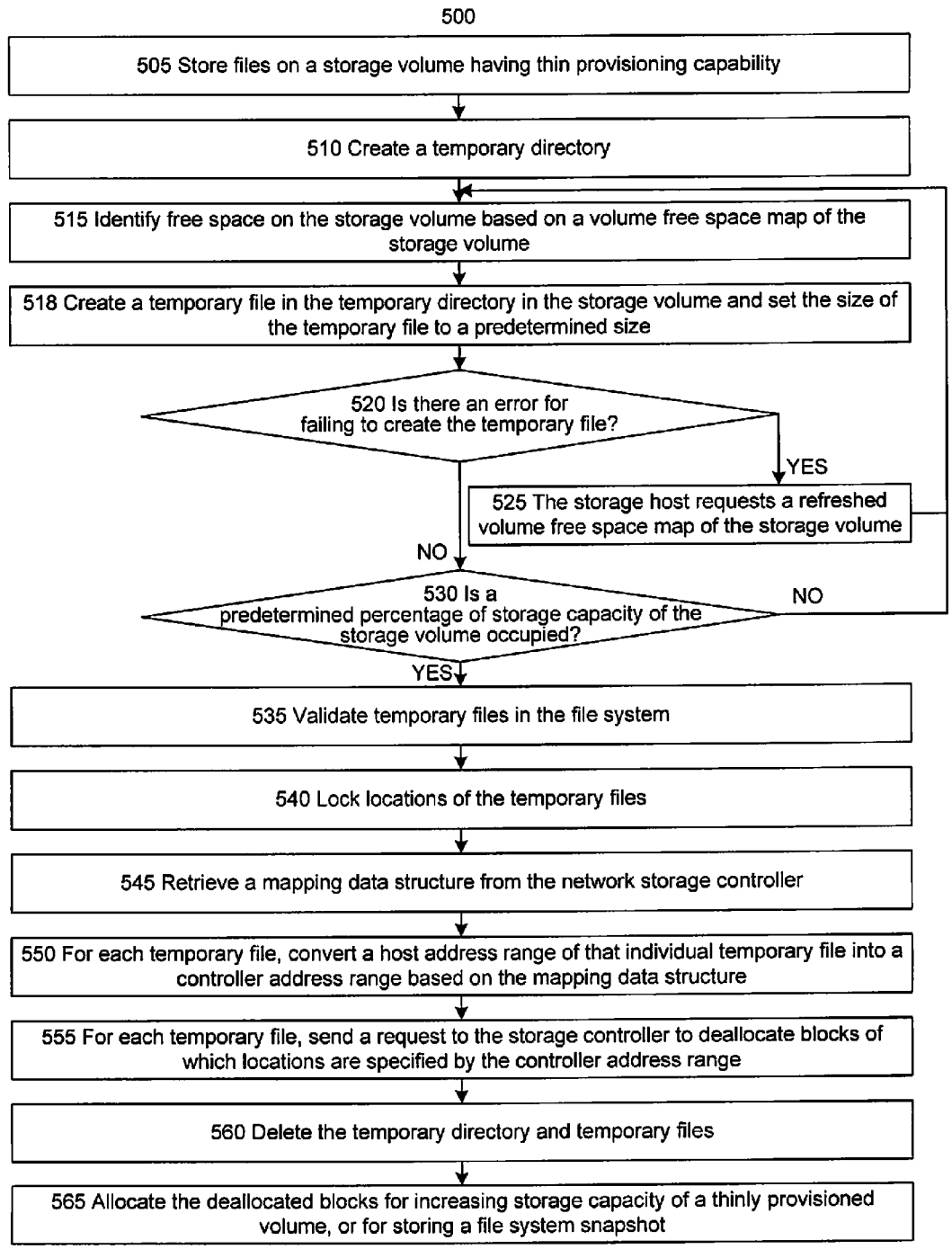
FIG. 5 illustrates an example of a storage space reclamation process.

FIG. 5 illustrates an example of a storage space reclamation process 500. In one embodiment, a storage host performs the storage space reclamation process on a CSV managed by an NTFS file system and served by a network storage controller. The space reclamation process can also be applied to types of volume other than CSV or volumes managed by other types of file systems.

At step 505 of the process 500, the storage host stores files on a storage volume having thin provisioning capability. The storage capacity of the storage volume can be automatically adjusted by the network storage controller. The storage volume is managed by a file system of the storage host and is served by (i.e., access to the volume is provided by) the storage controller. In one embodiment, the file system is an NTFS file system. In another embodiment, the storage volume is a CSV that is accessible by a plurality of nodes within a cluster. In yet another embodiment, the storage volume is a LUN controlled by the storage controller. In still another embodiment, the storage volume stores files representing virtual hard disk drive for virtual machines.

When the storage host deletes a file, the host does not directly notify the controller of the deletion of the file in a SAN environment. The storage volume contains blocks that are deallocated by the file system of the host and still remain allocated by the storage controller.

At step 510, the storage host creates a temporary directory on the storage volume. At step 515, the storage host identifies all free space on the storage volume based on a volume free space map of the storage volume that the storage host maintains in its memory or storage.

At step 518, the storage host creates a temporary file in the temporary directory in the storage volume and set the size of the temporary file to a predetermined size. In one embodiment, the predetermined size is the largest number of blocks that the storage controller can deallocate using a single SCSI command. In this respect, the predetermined size may be, for example, 244 MB. The storage host may choose a predetermined size smaller than the amount of available free space in the storage volume.

At step 520, the storage host checks whether there is an error in failing to create the temporary file. In a case where the storage volume is a CSV volume, an error can be caused by another host of the cluster accessing (e.g. writing) the same free space of the storage volume while the host was attempting to create the temporary file. If there is an error for failing to create the temporary file, at step 525 the storage host requests a refreshed volume free space map of the storage volume. Then the process goes back to state 515 in which the storage host creates the temporary file on the storage volume based on the refreshed volume free space map. Otherwise, the process continues to step 530.

At step 530, the storage host checks whether a predetermined (relatively high) percentage of storage capacity of the storage volume is occupied. In some embodiments, the predetermined percentage is 90%, 95%, 98%, 99% or 100%. If less than the predetermined percentage of storage capacity of the storage volume is occupied, the process goes back to step 515 to create another temporary file until in step 530 the occupied space is found to have reached the predetermined percentage of the storage capacity. Otherwise, the process continues to step 535.

At step 535, for each individual temporary file of the plurality of temporary files, the storage host validates that individual temporary file in the file system by setting the valid data length of that individual temporary file without writing zeros or other values to the blocks of that individual temporary file. Thus, the process takes less time than setting a size of the file, because there is no need to write any data into that individual temporary file for it to be validated.

At step 540, for each individual temporary file created in step 515, the storage host locks the location of that individual temporary file, so that no process or host can move any part of that individual temporary file for the remainder of the life of the file.

At step 545, the storage host retrieves a mapping data structure from the network storage controller. The mapping data structure that the network storage controller generates includes a mapping between host block addresses for the file system of the host and controller addresses for the network storage controller. The file system is capable of using the host address range for specifying block locations on the file system. The network storage controller is capable of using the controller address range for specifying block locations on the storage controller. In one embodiment, the host block addresses are NTFS sector addresses. The controller block addresses are WAFL block addresses. In another embodiment, the controller block addresses are Logical Block Addressing (LBA) addresses for specifying locations of blocks served by the network storage controller.

At step 550, for each individual temporary file created in step 515, the storage host converts a host address range of that individual temporary file (i.e. block address of its first logical block to block address of its last logical block) into a controller address range based on the mapping data structure. In one embodiment, the controller address range is a range of blocks addresses conforming to SCSI protocol.

At step 555, for each individual temporary file created in step 515, the storage host sends a request including the controller address range to the storage controller to deallocate blocks specified by the controller address range indicated in the request. In one embodiment, the request is a network request message including a SCSI command to instruct the storage controller to deallocate blocks specified by the controller address range indicated in the network request message. In another embodiment, the SCSI command is a SCSI UNMAP command.

At step 560, after all requests to deallocate these temporary files are sent to the storage controller, the storage host deletes the temporary directory and the plurality of temporary files from the storage volume managed by the file system of the host. In one embodiment, the storage host deletes the temporary directory and the temporary files after the storage host receives confirmation from the storage controller that the blocks indicated in the requests are deallocated.

At step 565, the storage controller has reclaimed the storage space, and again allocates the deallocated blocks to the storage host for increasing storage capacity of a thinly-provisioned volume, or for storing a file system snapshot.

Figure 6:
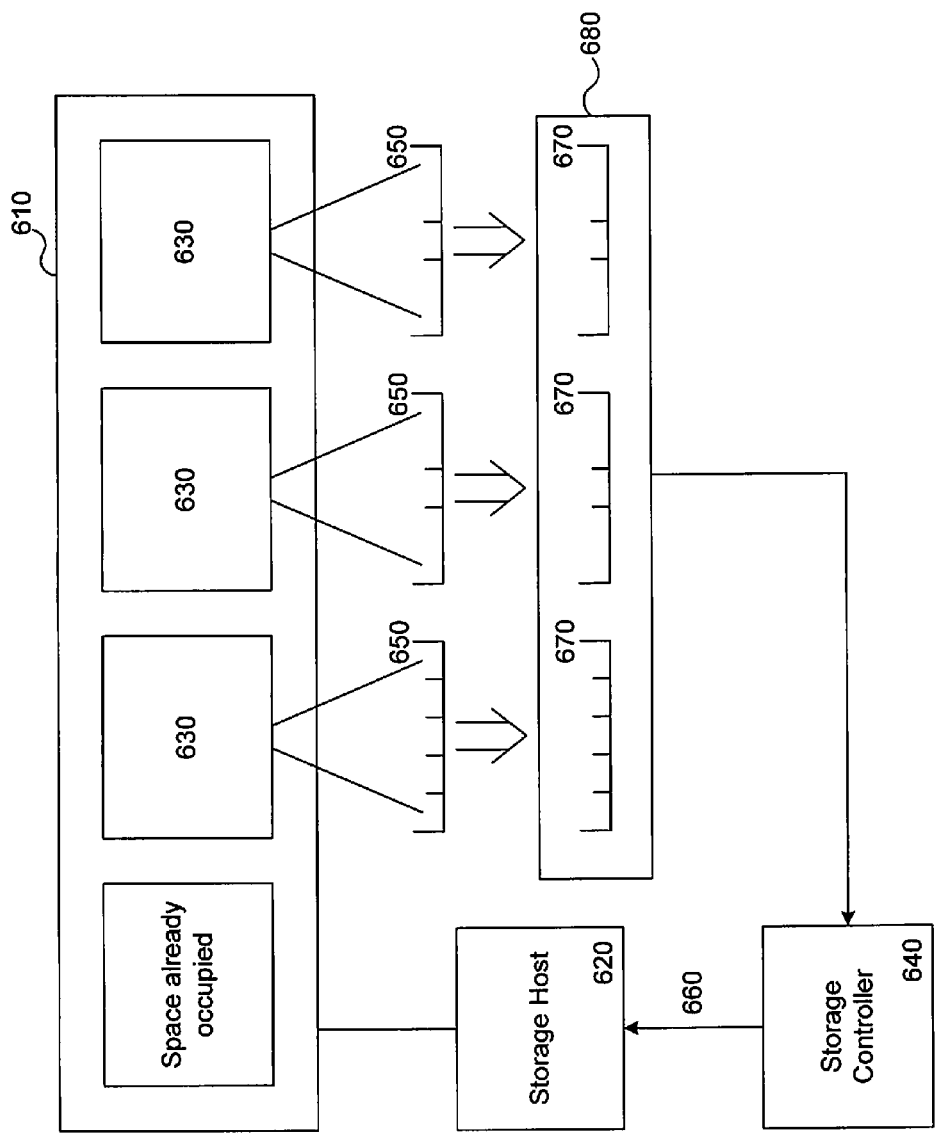
FIG. 6 illustrates an example of a storage host and a storage controller utilizing the storage space reclamation process.

As shown in FIG. 6, in one embodiment, the space reclamation process 500 can apply to a Windows CSV 610 that is supported by an NTFS-formatted LUN unit. A storage controller 640 provides the read and write access to the CSV 610. In such embodiment a storage host 620 of the Windows CSV 610 creates temporary files 630 on the CSV volume 610 until the CSV volume 610 is 98% full. The storage host 620 sets a size of each temporary file 630 to the largest size of blocks that the storage controller 640 can deallocate (i.e. unmap) with a single SCSI UNMAP command, which may be 244 MB, for example. The storage host 620 in one embodiment uses an NTFS application programming interface (API) (e.g. SetFileValidData) to notify the NTFS file system of the storage host 620 that the temporary files 630 are valid and need not be written with values such as zeroes before use. The storage host 620 uses another NTFS API (e.g. FSCTL_MARK_HANDLE) to lock the temporary files 630 so that the operating system (e.g. Windows) does not move any part of the files 630 for the remainder of their lives. Once the temporary files 630 are locked, the storage host 620 uses yet another NTFS API (e.g. FSCTL_GET_RETRIEVAL_POINTERS) to determine the NTFS sector ranges 650 of the blocks that contain the temporary files 630. The storage host 620 uses a mapping data structure 660 from the storage controller 640 to convert the NTFS sector ranges 650 for the temporary files 630 into block ranges 670 that correspond to the LUN's block address space. The storage host 620 sends a series of SCSI commands 680 to instruct the storage controller 640 to deallocate each of the blocks that contain the temporary files 630 specified by the converted block ranges 670. After the blocks are deallocated, the blocks are available for any other client to use. Finally, the storage host 620 deletes all of the temporary files 630 from the CSV.

The space reclamation process disclosed above does not use Windows' disk defragmentation API or relocation API which is not available for CSV volumes. The process can perform on a CSV volume while the CSV volume is in normal I/O mode. CSV is supported for use with Microsoft's Hyper-V virtualization hypervisor. Hyper-V virtual machines keep their data in fixed-size VHD files stored on the CSV. Other than occasions of virtual machines being created or destroyed, the amount of space consumed within a CSV is generally constant. Consequently, during the disclosed space reclamation process, filling the CSV for a few seconds or minutes with temporary files is unlikely to cause any issues for the virtual machines.

From the storage controller's perspective, as the blocks of each temporary file are unmapped immediately after it is created, there is little change in storage space consumption in a thinly-provisioned LUN. The disclosed space reclamation process does not waste any time checking to see whether blocks are already unmapped or zeroing blocks before unmapping them.

Capabilities such as thin provisioning can greatly improve storage efficiency. The disclosed space reclamation techniques ensure the benefits of thin provisioning will not erode over time. By executing the disclosed space reclamation process on a regular basis (e.g. on an automatic schedule), a thinly-provisioned volume may be maintained at high storage efficiency, such that the amount of storage space that the storage controller sees as consumed in the volume is no more than what is actually needed by the volume's host file system.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method comprising:
increasing a storage capacity of a storage volume accessible by a storage host, wherein the increasing comprises,
    determining whether a predetermined percentage of the storage capacity of the storage volume is occupied;
    in response to determining that the predetermined percentage of the storage capacity of the storage volume is occupied,
        creating at least one temporary logical container of data in the storage volume until at least the predetermined percentage of the storage capacity is not occupied;
    identifying, at a network storage controller, a storage controller address range, the storage controller address range corresponding to a host address range of the at least one temporary logical container of data;
    deallocating, by the network storage controller, blocks at locations indicated by the storage controller address range; and
    after the deallocating of the blocks,
        deleting the at least one temporary logical container of data from the storage volume; and
        allocating, by the network storage controller, the deallocated blocks to increase the storage capacity of the storage volume.

2. The method of claim 1, further comprising:
transmitting a mapping data structure to the storage host, the mapping data structure including information of mapping between host block addresses for the storage host and storage controller addresses for the network storage controller.

3. The method of claim 1, wherein the storage volume is served by a Logical Unit Number (LUN) unit controlled by the network storage controller.

4. The method of claim 1, wherein the storage controller address range is a range of block addresses conforming to Small Computer System Interface (SCSI) protocol.

5. The method of claim 1, further comprising:
receiving a command to instruct the network storage controller to deallocate blocks at the locations indicated by the storage controller address range.

6. The method of claim 1, wherein allocating the deallocated blocks comprises:
allocating the deallocated blocks to store data of a file system snapshot.

7. A method comprising:
storing logical containers of data in a storage volume, wherein the storage volume is managed by a file system of a host and is served by a storage controller, wherein the storage controller provides a thin provisioning capability to the storage volume;
increasing a storage capacity of the storage volume accessible by the host, wherein the increasing comprises,
    determining whether a predetermined percentage of a storage capacity of a storage volume is occupied;
    in response to determining that the predetermined percentage of the storage capacity of the storage volume is occupied,
        creating a plurality of temporary logical containers of data on the storage volume until at least the predetermined percentage of the storage capacity is not occupied; and
        for each individual temporary logical container of data of the plurality of temporary logical containers of data:
            converting a host address range of that individual temporary logical container of data into a storage controller address range, wherein the file system is capable of using the host address range for specifying block locations, and the storage controller is capable of using the storage controller address range for specifying block locations;
            sending a request including the storage controller address range to the storage controller to deallocate blocks at the block locations indicated by the storage controller address range; and
            after deallocation of the blocks,
                deleting the individual temporary logical container of data from the storage volume; and
                allocating, by the storage controller, the deallocated blocks to increase the storage capacity of the storage volume.

8. The method of claim 7, wherein the storage volume is Cluster Shared Volume (CSV) that is accessible by a plurality of nodes within a cluster.

9. The method of claim 7, further comprising:
retrieving a mapping data structure from the storage controller, the mapping data structure including information of mapping between host block addresses for the file system of the host and storage controller addresses for the storage controller.

10. The method of claim 7, further comprising:
creating a temporary directory to contain the plurality of temporary logical containers of data
and wherein the deleting comprises:
    deleting the temporary directory containing the plurality of temporary logical containers of data from the storage volume managed by the file system of the host.

11. The method of claim 7, further comprising:
for each individual temporary logical container of data of the plurality of temporary logical containers of data:
    setting a size of that individual temporary logical container of data to a predetermined size, wherein the predetermined size is a number of blocks that the storage controller can deallocate using a single deallocation command.

12. The method of claim 7, where the creating comprises:
creating the plurality of temporary logical containers of data on the storage volume without writing any data to blocks of the temporary logical containers of data so that a predetermined percentage of storage capacity of the storage volume is occupied.

13. One or more non-transitory machine-readable storage media having program code for reclaiming storage space stored therein, the program code comprising instructions to:
  store logical containers of data in a storage volume, wherein the storage volume is managed by a file system of a host and is served by a storage controller, wherein the storage controller provides a thin provisioning capability to the storage volume;
  increase a storage capacity of the storage volume accessible by the host, wherein the instructions to increase the storage capacity comprises instructions to,
  determine whether a predetermined percentage of a storage capacity of a storage volume is occupied;
  in response to a determination that the predetermined percentage of the storage capacity of the storage volume is occupied,
    create a plurality of temporary logical containers of data on the storage volume;
    for each individual temporary logical container of data of the plurality of temporary logical containers of data:
      convert a host address range of that individual temporary logical container of data into a storage controller address range, wherein the file system is capable of using the host address range for specifying block locations, and the storage controller is capable of using the storage controller address range for specifying block locations, and
      send a request including the storage controller address range to the storage controller to deallocate blocks at the block locations indicated by the storage controller address range; and
      after deallocation of the blocks,
        delete the individual temporary logical container of data from the storage volume; and
        allocate, by the storage controller, the deallocated blocks to the host to increase the storage capacity of the storage volume.

14. The one or more non-transitory machine-readable storage media of claim 13, wherein the individual temporary logical container of data is created on free space of the storage volume, the free space is determined by a volume free space map of the storage volume.

15. The one or more non-transitory machine-readable storage media of claim 13, wherein the program code comprises instructions to:
  in response to an error that the file system fails to create a temporary logical container of data, request a refreshed volume free space map of the storage volume and continue creation of the temporary logical container of data on the storage volume based on the refreshed volume free space map.

16. The one or more non-transitory machine-readable storage media of claim 13, wherein the storage volume is Cluster Shared Volume (CSV) that is accessible by a plurality of hosts including the host within a cluster, and the file system generate an error failing to create a temporary logical container of data when a host of the plurality of hosts accesses the storage volume.

17. The one or more non-transitory machine-readable storage media of claim 13, wherein the storage controller address range is a range of Logical Block Addressing (LBA) addresses for specifying the block locations of blocks served by the storage controller, and the request includes a SCSI command for the storage controller to deallocate blocks at the block locations indicated by the range of LBA addresses.

18. The method of claim 7, wherein when the host deletes a logical container of data, the host does not notify the storage controller of the deletion of the logical container of data.

19. One or more non-transitory machine-readable storage media having program code for reclaiming storage space stored therein, the program code comprising instructions to:
  increase a storage capacity of a storage volume accessible by a storage host, wherein the instructions to increase the storage capacity comprises instructions to,
  determine whether a predetermined percentage of the storage capacity of the storage volume is occupied;
  in response to a determination that the predetermined percentage of the storage capacity of the storage volume is occupied,
    create at least one temporary logical container of data in the storage volume until at least the predetermined percentage of the storage capacity is occupied;
    identify, at a network storage controller, a storage controller address range, the storage controller address range corresponding to a host address range of the at least one temporary logical container of data;
    deallocate, by the network storage controller, blocks at locations indicated by the storage controller address range; and
    after deallocation of the blocks,
      delete the at least one temporary logical container of data from the storage volume; and
      allocate, by the network storage controller, the deallocated blocks to increase the storage capacity of the storage volume.

20. The one or more non-transitory machine-readable storage media of claim 19, wherein the program code comprises instructions to:
  transmit a mapping data structure to the storage host, the mapping data structure including information of mapping between host block addresses for the storage host and storage controller addresses for the network storage controller.

21. The one or more non-transitory machine-readable storage media of claim 19, wherein the storage volume is served by a Logical Unit Number (LUN) unit controlled by the network storage controller.

22. The one or more non-transitory machine-readable storage media of claim 19, wherein the storage controller address range is a range of block addresses conforming to Small Computer System Interface (SCSI) protocol.

23. The one or more non-transitory machine-readable storage media of claim 19, wherein the program code comprises instructions to:
  receive a command to instruct the network storage controller to deallocate blocks at the locations indicated by the storage controller address range.

24. The one or more non-transitory machine-readable storage media of claim 19, wherein the program code comprising instructions to allocate the deallocated blocks comprises program code comprising instructions to:
  allocate the deallocated blocks to store data of a file system snapshot.

* * * * *